United States Patent

[11] 3,609,676

[72] Inventors Christian Jauquet
  Charleroi;
  Joseph Claes, Serclaes de Tilly, both of Belgium
[21] Appl. No. 853,346
[22] Filed Aug. 27, 1969
[45] Patented Sept. 28, 1971
[73] Assignee Ateliers de Constructions Electriques de Charleroi (ACEC)
  Charleroi, Belgium
[32] Priority Aug. 30, 1968
[33] Belgium
[31] 62,837

[54] DEVICE FOR DETECTING THE POSITION OF A RAILWAY VEHICLE ON A TRACK
  2 Claims, 3 Drawing Figs.
[52] U.S. Cl..................................................... 340/23,
  246/187 B, 180/98
[51] Int. Cl........................................................ G08g 1/00
[50] Field of Search............................................ 340/23;
  180/98; 246/187 B

[56] References Cited
UNITED STATES PATENTS
3,029,893  4/1962  Mountjoy................... 246/187 B
3,440,600  4/1969  Frech et al.................. 340/23

FOREIGN PATENTS
1,455,381  1/1969  Germany

OTHER REFERENCES
"Control Techniques Revitalize Railroads," Barlow, Derek H., Control Engineering March 1964

Primary Examiner—Kathleen H. Claffy
Assistant Examiner—Jan S. Black
Attorney—Raymond A. Robic ABSTRACT: A device for detecting the position of a train on a railway track equipped with a centralized control over the travel of the train using a transmission cable having crossings or other means defining periodic phase inversions of the magnetic field of the cable. It comprises three antennas located underneath the floor of the locomotive of the train and aligned one after the other in the longitudinal direction of the track, a band-pass filter connected to each antenna, three phase detectors, each one having two inputs connected to the outputs of two of the band-pass filters in accordance with the three different possibilities, such phase detectors being arranged to deliver an output signal only when their input voltages are in phase opposition, a logic circuit having three inputs connected respectively to the outputs of the three phase detectors for detecting the direction of travel of the train, and a summing circuit for totalizing the number of marking points crossed by the train connected to the outputs of the logic circuit, such logic circuit having two outputs delivering counting and deduction signals to the summing circuit.

INVENTORS
Christian JAUQUET
Joseph CLAES

ATTORNEY

DEVICE FOR DETECTING THE POSITION OF A RAILWAY VEHICLE ON A TRACK

This invention relates to an apparatus for establishing a two-way communication between a central location and a train or any other railway vehicle by induction between a cable forming a loop located between the rails on which the railway vehicle travels, and receiving and transmitting antennas located on the locomotive of the railway vehicle.

In order to know the position of a train in a sector defined by the above-mentioned cable, it is know to give marking points to such cable in such a way that regularly spaced crossings are detected by the locomotive, taking advantage of the fact that, at the passage of such marking points, the signals received by the antennas undergo either a variation of amplitude or an inversion of phase. The marking points may then be counted, which provides an indication of the position of the train in the sector.

The detection by amplitude variations presents serious drawbacks concerning the security thereof, more particularly when the marking points consist of simple crossings wherein the time interval during which the lowering of the level of the signals received occurs in very short. A stray signal occuring at the passage of a crossing may result in the nondetection of such crossing and the train will, in this case, be located closer to the next obstacle that it is supposed to be.

The detection by phase inversion is much safer. Indeed, because at least two antennas are always used on the locomotive, to ensure the continuity of the transmission at the passage of a crossing and because the distance between these two antennas, in the direction of movement, is approximately 2 meters, the time interval, for a train travelling at 200 km./h., during which the phase difference of 180° exists between the voltages detected by the two antennas is in the order of 36 milliseconds. This provided a signal which may be more easily distinguished from a stray signal.

The present invention more specially concerns apparatuses where use in made of the last-mentioned detection process, and ascertains the measure of the position of the trains against interfering stray signals.

It may happen that a train, stopped in a sector defined by a cable starts to go backwards, either accidentally in a hill or to carry out a shunting operation, or for any other reason. In this case, it is important that the marking points encountered when going backward be not counted the same way as if they were crossed in the normal direction of travel, but they may be deducted. Otherwise, upon resuming the normal travelling direction, these marking points would have been counted three times instead of one, which would obviously falsify the indication of the position of the train.

The invention provides for the deduction of the marking points encountered when going backward whatever may be the direction of travel of the train on the tracks. It comprises, to that effect, means for detecting the incoming of the locomotive in the sector defined by the cable either by one or the other of its driving positions.

The device, in accordance with the invention, is applicable to an apparatus in which use is made of a transmission cable having crossings or other means defining periodic phase inversions of the magnetic field of the cable and acting on receiving antennas located underneath the floor of the locomotive. It is characterized by the fact that it comprises three aligned receiving antennas located one after the other in the longitudinal direction of the track, each antenna being connected to a band-pass filter, three phase detectors each having two inputs connected to the outputs of two of the above band-pass filters in accordance with the three possible different possibilities, such phase detectors being arranged to deliver an output signal only when their input voltages are in phase opposition, a logic circuit for detecting the direction of travel of the train having three inputs connected respectively to the outputs of the three phase detectors, an invertor circuit for eventually permuting two of the phase detector outputs, corresponding to two adjacent antennas, such logic circuit for detecting the direction of travel of the train having two outputs for delivering respectively counting and deduction signals to a circuit for summing the number of marking points.

In accordance with another characteristic of the invention, the device comprises two threshold level detectors connected respectively to the two opposite antennas through band-pass filters and having outputs connected each through the intermediate of a low-pass filter to a second logic circuit for detecting the normal direction of travel of the train. The output of the last-mentioned logic circuit operates the above-mentioned inverter circuit in a direction or the other in accordance with the direction of travel of the train on the tracks at the time of crossing the sector defined by the cable, means being provided to store the state of such last-mentioned logic circuit during the full travel of the train in the sector under consideration.

The invention will now be disclosed with reference to the following description and to the attached drawings which illustrate an example of an embodiment of the invention in which.

Figure 1:
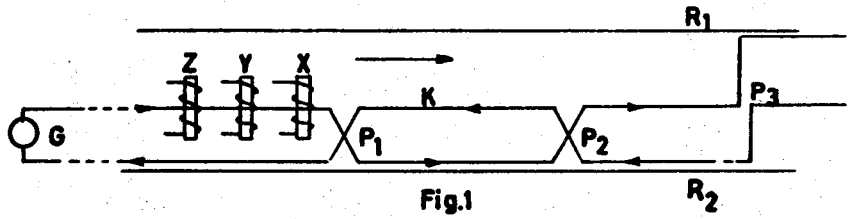
FIG. 1 illustrates a railway track along the path of which is disposed a cable and three detecting antennas.

In FIG. 1, there is shown a railway track made of two rails $R_1$ and $R_2$ between which is disposed a loop formed by cable K and fed from a central location by alternating signals originating from a generator G. Cable K has periodic marking points such as $P_1$, $P_2$, ... $P_3$... The marking points $P_1$, $P_2$ are simple crossings while marking point $P_3$ is a transposition of the two sides of the cable. In any case, it may be seen in FIG. 1 that at the crossing of these marking points, the current in the active part of the cable undergoes a phase inversion of 180°.

Figure 2:
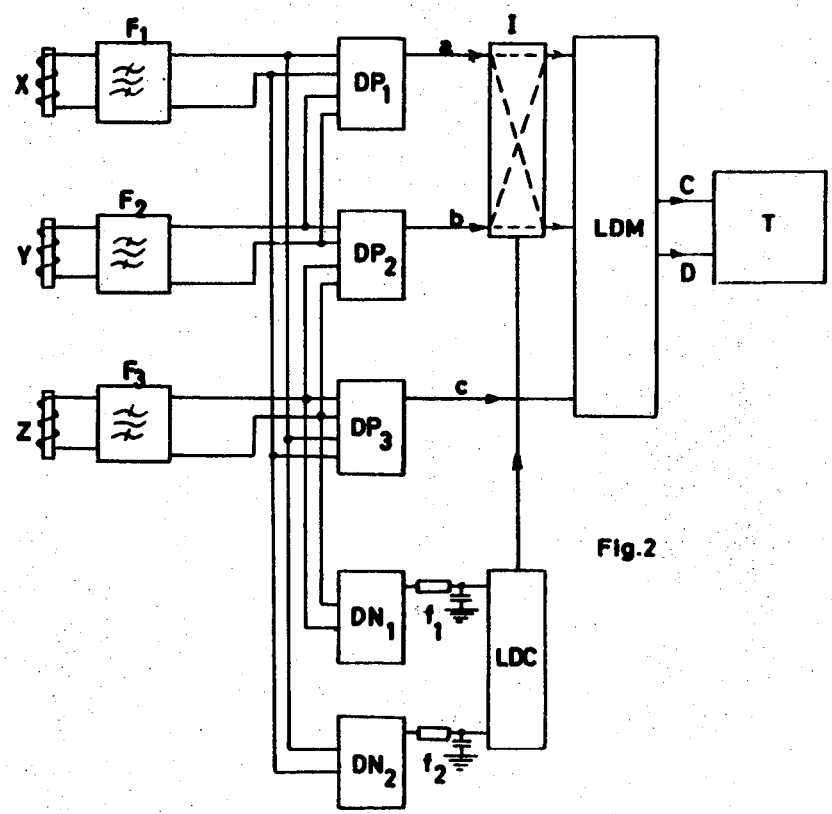
FIG. 2 illustrates a device for counting the marking points, that is the measure of the distance travelled by the train.

The device for counting the marking points, that is the measure of the distance travelled by a train, is illustrated in FIG. 2. It comprises three antennas X, Y, Z, located underneath the floor of a locomotive in the order indicated in FIG. 1 where the arrow indicates the normal direction of travel of the train on the tracks. The antennas are connected respectively to band-pass filters $F_1$, $F_2$, $F_3$ whose output signals, which may be designated $x$, $y$, $z$ respectively, are applied two-by-two to phase detector circuits $DP_1$, $DP_2$, $DP_3$ which provide at their outputs a logic signal representing a state 1 when their two input signals have a phase difference of 180°. An example of such detectors is illustrated in Belgian Pat. No. 720,173 filed Aug. 30, 1968 and entitled "Phase Detector, Particularly for Use in Measuring the Distance Travelled by a Railway Vehicle." The above phase detecting circuits receive respectively at their inputs the signals $x$ and $y$, $y$ and $z$, $z$ and $x$. The output signals of the phase detectors $DP_1$, $DP_2$, $DP_3$ designated respectively by $a$, $b$, and $c$ are applied to a logic circuit LDM for detecting the direction of travel of the train. Such logic circuit LDM energizes a circuit T, which sums the number of marking points, counting signals C and deducting signals D. The signals $a$ and $b$ pass through an inverter circuit I whose function is to eventually permute such signals and whose control will be explained in the following part of the description.

Figure 3:
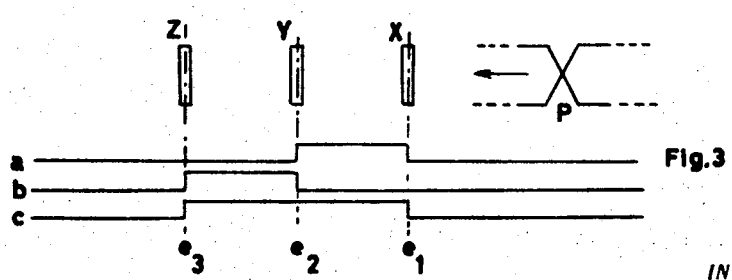
FIG. 3 illustrates the waveforms of the variables $a$, $b$, and $c$ of FIG. 2 as the function of the distance travelled by the train.

FIG. 3 illustrates the wave forms, in function of the distance travelled by the train, of variables $a$, $b$, and $c$ at the time of crossing a marking point P in the normal direction of travel or, which is the same, in the assumption that the crossing P is displaced in the opposite direction, the antennas X, Y and Z being fixed. When the crossing is located in the vicinity of the antennas, the variable logic $c$ takes the value 1. The logic circuit LDM is designed in such a way that, in this case, it provides a counting signal to the summing circuit T when the variable $b$ has a value 1 (between points $e_2$ and $e_3$ after the variable $a$ has taken the value 1 (between points $e_1$ and $e_2$). It provides, on the contrary, a deduction signal when the crossing is located in the vicinity of the antennas ($c=1$) and there is obtained $a=1$ after having obtained $b=1$.

It happens sometimes that the train must travel on the tracks with the locomotive directed in such a way that the antennas cross the marking points in the inverse successive order Z, Y, X. In this case, the crossings must be positively counted and they must be deducted only when the train goes backward. The apparatus is, for this purpose, equipped with a logic circuit LDC for detecting the normal direction of travel of the train. The input variables of the last-mentioned circuit are provided by two threshold detectors $DN_1$ and $DN_2$ to the input of which are applied respectively the output signals provided by the opposite antennas X and Z after passing through the band filters $F_1$ and $F_3$. The last-mentioned detectors are sensible to the input signals only when these signals exceed a predetermined threshold. They are equipped, at their output, with low-pass filters $f_1$ and $F_2$ and they provide to logic circuit LDC a variable logic having a state 1 when their input signal exceeds the threshold level which has been assigned to them. The circuit LDC is designed in such a way that when the variable input logic originating from $DN_1$ takes the state 1 before the one originating from $DN_2$ takes the same state, its output has the state 0. The output of circuit LDC takes the state 1 in the situation corresponding to the inverse succession of input variables in which case it causes the operation of circuit inverter I which permits the variables $a$ and $b$. This consequently, establishes a correct count. The circuit LDC is arranged in such a way that the state acquired and the input of a defined sector by the cable is stored during all the travel of the train in such sector.

The different circuits used in the above-disclosed device and not described in detail may be realized in various ways and different embodiments may be designed without departing from the scope of the present invention.

We claim:

1. In a centralized train control system wherein a cable forming a loop is located between two rails of a track and fed by alternating currents and wherein said cable has crossings therein or other marking points defining periodic phase inversions of the magnetic field of the cable, which marking points are counted aboard the locomotive of a train in order to provide an indication of the distance traveled by the locomotive in the zone defined by the cable, a device for deducting from the marking points encountered in the normal direction of travel those encountered when going backward, comprising three antennas located underneath the floor of the locomotive and following each other in the direction of the track, means for comparing two-by-two the phases of the voltages induced by the cable in the different antennas at the passage of a marking point and for delivering a logic output signal having the value 1 when the two compared phases are in opposition, means for detecting the order of succession of said logic signals and for delivering a counting signal or a deduction signal depending upon said order of succession, and means for summing said counting and deduction signals with their appropriate signs.

2. A device according to claim 1, wherein the locomotive has front and rear cabins which may be alternatively placed ahead of the train thereby reversing the order of succession of the signals delivered by the antennas, and further comprising means for detecting which one of the two extreme antennas is ahead of the train at the entry of the locomotive in the zone defined by the cable, means responsive to said detecting means for storing the state acquired by the antennas at the entry of the zone defined by the cable, and means responsive to said detecting means for inverting or not two of said logic input signals depending upon the order of succession of the signals delivered by the two extreme antennas at the passage of a marking point so as to obtain a correct counting depending on which one of the two driving cabins of the locomotive is ahead of the train.